United States Patent
Wehrung et al.

(10) Patent No.: US 10,834,147 B1
(45) Date of Patent: Nov. 10, 2020

(54) CONTROLLING COMMUNICATION DEVICES USING A WEB-BASED UNIFIED COMMUNICATIONS PLATFORM

(71) Applicant: Fuze, Inc., Boston, MA (US)

(72) Inventors: Clement Wehrung, Paris (FR); Jedidiah Brown, Seattle, WA (US)

(73) Assignee: Fuze, Inc., Boston, MA (US)

( * ) Notice: Subject to any disclaimer, the term of this patent is extended or adjusted under 35 U.S.C. 154(b) by 33 days.

(21) Appl. No.: 16/361,895

(22) Filed: Mar. 22, 2019

Related U.S. Application Data (60) Provisional application No. 62/647,277, filed on Mar. 23, 2018.

(51) Int. Cl.
 *H04L 29/06* (2006.01)
 *H04L 29/08* (2006.01)
 *H04L 12/58* (2006.01)

(52) U.S. Cl.
 CPC ........ *H04L 65/1069* (2013.01); *H04L 51/043* (2013.01); *H04L 65/1006* (2013.01); *H04L 65/1023* (2013.01); *H04L 65/1046* (2013.01); *H04L 65/1063* (2013.01); *H04L 67/025* (2013.01); *H04L 67/24* (2013.01)

(58) Field of Classification Search
 CPC . H04L 65/1069; H04L 65/1023; H04L 67/24; H04L 51/043
 See application file for complete search history.

(56) References Cited

U.S. PATENT DOCUMENTS

2009/0316685 A1*  12/2009  Mandre ............... H04L 67/24
                                                     370/352
2014/0044123 A1*   2/2014  Lawson ............ H04L 65/1023
                                                     370/352

* cited by examiner

*Primary Examiner* — Kyung H Shin
(74) *Attorney, Agent, or Firm* — McDermott, Will & Emery LLP (57) ABSTRACT

Methods and systems for controlling a communication device using a web-based unified communication platform are provided. In one aspect, a method includes receiving initial call status data from notification services. The method includes configuring bi-directional data binding between the platform and call servers. The method also includes generating a call initiation request by providing parameters associated with the first communication device to the call servers and transmitting the call initiation request to the first communication device. The method also includes connecting, in response to the first communication device accepting the call initiation request, the first communication device to the platform to facilitate a call to a second communication device. The method also includes receiving updated call status data associated with the call. The method also includes providing action controls associated with the call to a first client device associated with a user via a graphical user interface in a web-browser.

19 Claims, 8 Drawing Sheets

CONTROLLING COMMUNICATION DEVICES USING A WEB-BASED UNIFIED COMMUNICATIONS PLATFORM

CROSS-REFERENCE TO RELATED APPLICATIONS

The present application claims the benefit of priority under 35 U.S.C. § 119 from U.S. Provisional Patent Application Ser. No. 62/647,277 entitled "SYSTEM AND METHOD FOR CONTROLLING COMMUNICATION DEVICES USING A WEB-BASED UNIFIED COMMUNICATIONS PLATFORM," filed on Mar. 23, 2018, the disclosure of which is hereby incorporated by reference in its entirety for all purposes.

TECHNICAL FIELD

The present disclosure generally relates to communication devices, and more specifically relates to controlling communication devices using a web-based communication platform.

BACKGROUND

A person seeking to control a communication device, such as a desktop phone or mobile phone, is typically required to be in the immediate presence of the device in order to input actions to control the device. Remote control of communication devices via a browser may be limited to manipulating content that is synchronized between a browser-based application and the communication device. For example, synchronized content such as voice mail, email, instant messages, and calendar or contact information may be manipulated in a browser and the action will be reflected in the content that is synchronized on the communication device. Such browser-based manipulation may provide action control in regard to the content, but does not afford a user to control actions for which the communication device is specifically configured to perform like placing, receiving, transferring, holding, or muting a call on a phone.

In addition, existing browser-based solutions that provide support for integrated communication devices are limited to controlling audio input/output devices. An audio input/output device, such as a headset or microphone, may be connected to the communication device via universal serial bus (USB) or wireless technologies, for example Bluetooth™. The audio input/output devices have very basic controls such as muting a call, accepting or hanging up a call, and call volume adjustment. Essentially, the audio input/output devices operate as extensions or slave devices to the computing or communication device to which they are connected or paired. The audio input/output devices may provide controls to trigger a limited set of actions in regard to a call, but the audio input/output devices are not communication devices which include a diverse range of communication functionality as typically found on a desktop phone, for example. These solutions enable users to install and configure the audio input/output devices in a web browser, but they do not enable users to control the full spectrum of controls available on the communication device to which the audio input/output devices may be connected in a web browser.

The description provided in the background section should not be assumed to be prior art merely because it is mentioned in or associated with the background section. The background section may include information that describes one or more aspects of the subject technology.

SUMMARY

The disclosed system and method enable a user to control a communication device using a web-based unified communication platform. The unified communication platform may be implemented in a web-based client, for example a web browser and provide for integration with multiple communication devices associated with a user. For example, the platform may be integrated with a users' desktop phone in their office, as well as, the users mobile or cellular phone, smartphone or tablet. Integrating the platform and the user's communication devices allows the user to perform a broad range of functionality configures on the communication using the web-based platform. For example, desktop office phones typically include a rich array of features such as call forwarding, redialing, call hold, call conferencing, shortcut-key dialing, availability indicators, phone directory menus, and voice message recording and retrieval in addition to basic functions such as initiating and receiving a call. Using the unified communication platform, a user may configure and integrate their desktop office phone with the platform, and once configured, the platform will provide action controls associated with the features of the user's desktop office phone in a graphical user interface on a web browser. In the disclosed system, the computing device on which the unified communication platform is implemented may operate independently from the communication device configured within the platform. While these devices may operate independently, the unified communication platform may provide call state data in real time or near real-time and provide advanced call controls for both devices. For example, the unified communication platform may provide the user with complete information about an ongoing call at the computing device on which the platform is configured. In this way, a bi-directional data and control schema is established. In one direction, control actions may be input to the computing device via the platform and transmitted to the communication device. In a second direction, call state data from the communication device may be received by the computing device via the platform and provided to the user in a graphical user interface on a web browser. A user may configure multiple communication devices with the platform. The platform will separately identify each configured communication device and provide action controls specifically associated with each different communication device corresponding to a particular user in the web-based graphical user interface.

The disclosed methods and systems provide for controlling a communication device using a web-based unified communication platform. In one aspect of the present disclosure, a computer-implemented method is described that includes receiving initial call status data from one or more notification services. The computer-implemented method also includes configuring bi-directional data binding between the platform and one or more call servers, wherein the bi-directional data binding includes communication device controls associated with a first communication device. The computer-implemented method also includes generating a call initiation request by providing one or more parameters associated with the first communication device to the one or more call servers and transmitting the call initiation request to the first communication device. The computer-implemented method also includes connecting, in response to the first communication device accepting the call initiation request, the first communication device to the platform to facilitate a call to a second communication device. The computer-implemented method also includes receiving updated call status data associated with the call from the one or more notification services. The computer-implemented method also includes providing one or more action controls associated with the call to a first client device associated with a user via a graphical user interface in a web-browser.

According to certain aspects of the present disclosure, a system is provided that includes a memory comprising instructions and one or more processors configured to execute the instructions to receive initial call status data from one or more notification services. The one or more processors also execute instructions to configure bi-directional data binding between the platform and one or more call servers, wherein the bi-directional data binding includes communication device controls associated with a desktop phone. The one or more processors also execute instructions to generate a call initiation request by providing one or more parameters associated with the desktop phone to the one or more call servers and transmitting the call initiation request to the desktop phone. The one or more processors also execute instructions to connect, in response to the desktop phone accepting the call initiation request, the desktop phone to the platform to facilitate a call to a communication device. The one or more processors also execute instructions to receive updated call status data associated with the call from the one or more notification services. The one or more processors also execute instructions to provide one or more action controls associated with the call to a first client device associated with a user via a graphical user interface in a web-browser. The one or more processors also execute instructions to switch the one or more action controls from the first client device to a second client device.

In yet another aspect, a non-transitory machine-readable storage medium comprising machine-readable instructions for causing one or more processors to execute a method. The method includes receiving initial call status data from one or more notification services. The method also includes configuring bi-directional data binding between the platform and one or more call servers, wherein the bi-directional data binding includes communication device controls associated with a desktop phone. The method also includes generating a call initiation request by providing one or more parameters associated with the desktop phone to the one or more call servers and transmitting the call initiation request to the desktop phone. The method also includes connecting, in response to the desktop phone accepting the call initiation request, the desktop phone to the platform to facilitate a call to a communication device. The method also includes receiving updated call status data associated with the call from the one or more notification services. The method also includes providing one or more action controls associated with the call to a first client device associated with a user via a graphical user interface in a web-browser. The method also includes switching the one or more action controls from the first client device to a second client device.

In yet another aspect, a system is described that includes a means for receiving initial call status data from one or more notification services. The means for receiving initial call status data also includes configuring bi-directional data binding between the platform and one or more call servers, wherein the bi-directional data binding includes communication device controls associated with a first communication device. The means for receiving initial call status data also includes generating a call initiation request by providing one or more parameters associated with the first communication device to the one or more call servers and transmitting the call initiation request to the first communication device. The means for receiving initial call status data also includes connecting, in response to the first communication device accepting the call initiation request, the first communication device to the platform to facilitate a call to a second communication device. The means for receiving initial call status data also includes receiving updated call status data associated with the call from the one or more notification services. The means for receiving initial call status data also includes providing one or more action controls associated with the call to a first client device associated with a user via a graphical user interface in a web-browser.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The unified communication platform integrates communication devices and computing devices, such as an internet enabled client computing device, allowing software-based representation and control of communication devices to platform users. Software-based integration of the communication devices that are configured within the platform allows call state and communication device controls to be represented to the user in real-time, or near real-time. In this way, users are provided with an enriched communication experience that provides the functionality of their specialized communication devices (e.g., their desktop office phone) without having to be in physical proximity with the communication device to input actions that control the broad range of functionality. The platform further provides users with flexibility to communicate using any one of multiple communication devices in a web browser without sacrificing the native call control or functionality that is natively configured on the communication devices. The unified communication platform further supports additional communication types, such as video and/or messaging, to provide users with a single, simplified communication experience.

The unified communication platform may be implemented as a system utilizing a client-server and web services architecture. Portions of the platform may be configured in an application on a client computing device and portions of the platform may be configured in a server as a backend to the client. The platform may include notification services to provide call status data and call servers. The call servers may be configured for bi-directional data binding or handshaking with the platform for a given communication device. The communication device and call servers and/or notification services may be coordinated by passing one or more parameter values in application programming interfaces (APIs) to the call servers and/or notification services. One or more of the APIs may utilize session initiation protocols (SIP) as well as representational state transfer (RESTful) web services protocol. The parameters may include data corresponding to usernames, passwords, authentication data, device identification data, communication session data, and device control data. Additionally, the parameters may also include data associated with queues, subscriptions, user maintenance, synchronizing communications or messages, metrics, and device rebooting.

The disclosed system provides an improvement to computer functionality that is integrated into a practical application. The disclosed system addresses a technical problem tied to computer technology and arising in the realm of computer networks, namely the technical problem of limited, non-fluid control of a communication device functionality via another device. The disclosed system solves this technical problem by providing a unified communication platform that integrates with communication devices and multiple client devices associated with a user for fluid control of the communication devices from the multiple client devices. The unified communication platform of the disclosed system synchronizes the communication devices and the multiple client devices, and allows full communication spectrum control of the communication devices from a selection of any of the multiple client devices.

Example System Architecture

Figure 1:
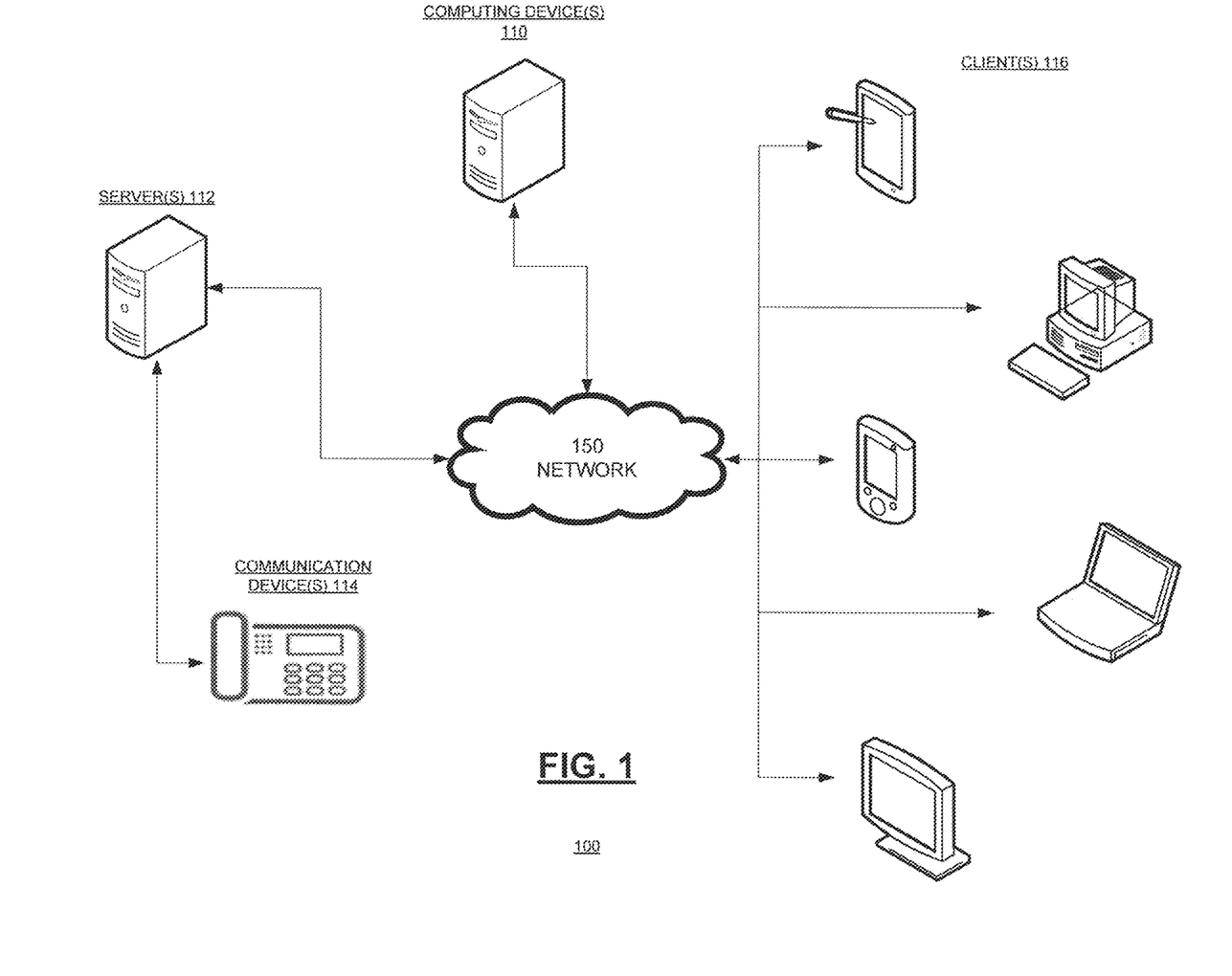
FIG. 1 illustrates an example architecture for controlling a communication device using a web-based unified communication platform according to certain aspects of the disclosure.

FIG. 1 illustrates an example architecture 100 for controlling a communication device using a web-based unified communication platform. The architecture 100 includes one or more computing devices 110, one or more servers 112, one or more communication devices 114, and one or more clients 116 connected over a network 150.

The computing device 110 is configured to host a platform 210 (see FIG. 2), such as, for example, a unified communication platform for controlling the one or more communication devices 114. For purposes of load balancing, a plurality of computing devices 110 may host the platform 210. The computing device 110 may be any device comprising an appropriate processor, memory, and communications capability for hosting the platform 210.

The platform 210 of the disclosed system is configured to integrate the communication device 114 that is associated with a user and the client 116. As such, the disclosed system can, for example, allow the user to perform a wide range of communication device controls, which are associated with the communication device 114, on the client 116 that is associated with the user via a graphical user interface (GUI). As a result, the platform 210 provides the user with fluid control to selectively manipulate the communication device controls of the communication device 114 via the client 116, as will be explained in more detail below.

The one or more servers 112 can be any device having an appropriate processor, memory, and communications capability for facilitating a bi-directional binding with the platform 210. Each of the servers 112 can be directly connected to a corresponding communication device 114 and can be configured for bi-directional data binding or handshaking with the platform 210 for a given one of the corresponding communication devices 114. In certain aspects, the one or more servers 112 can be a cloud computing server of an infrastructure-as-a-service (IaaS) and be able to support a platform-as-a-service (PaaS) and software-as-a-service (SaaS) services. In some implementations, the bi-directional binding includes configuring session initiation protocol data.

The one or more communication devices 114 can be any suitable device that may perform audio and/or video communications. Examples of the one or more communication devices 114 may include, but is not limited to, desktop phones, mobile phones, VoIP phones, desktop computers, laptop computers, and the like.

The one or more clients 116 may be, for example, desktop computers, mobile computers, tablet computers (e.g., including e-book readers), mobile devices (e.g., a smartphone or PDA), and/or other devices having appropriate embedded processor, memory, and communications capabilities for accessing resources on the network 150. Each client of the one or more clients 116 is configured to host either a web application 212 (see FIG. 2) or a mobile application 214.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network may be wired or wireless, as mentioned herein below.

Figure 2:
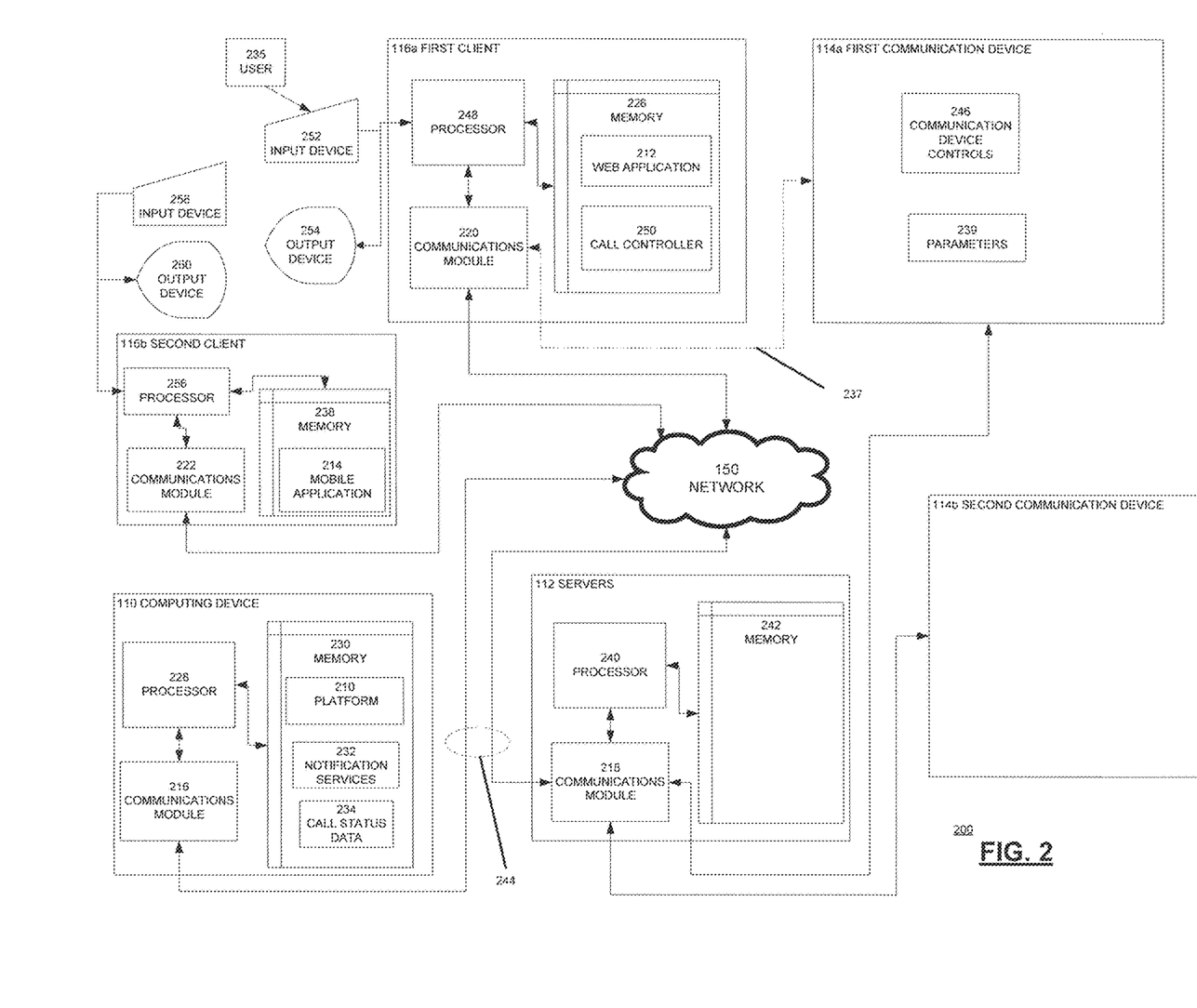
FIG. 2 is a block diagram illustrating an example computing device(s), server(s), client(s), and communication device(s) in the architecture of FIG. 1 according to certain aspects of the disclosure.

Illustration of Method for Controlling Communication Devices Using a Web-Based Unified Communication Platform FIG. 2 is a block diagram illustrating an example system 200 comprising the computing device 110, the one or more servers 112, the one or more communication devices 114, such as a first communication device 114a and a second communication device 114b, and the one or more clients 116, such as a first client device 116a and a second client device 116b, shown in the architecture 100 of FIG. 1 according to certain aspects of the disclosure.

In this example, the computing device 110, the one or more servers 112, the first client device 116a, and the second client device 116b can be connected over the network 150 via respective communications modules 216, 218, 220, 222. The communications modules 216, 218, 220, 222 are configured to interface with the network 150 to transmit and receive information, such as data, requests, responses, and commands to other devices on the network 150. In this example, the first communication device 114a and the second communication device 114b are desktop phones and are connected to the network 150 via connection to the communications module 218 of respective one or more servers 112. In certain aspects, the communications module 218 of each respective one or more servers 112 can be correspondingly connected to the first communication device 114a and the second communication device 114b via private branch exchange (PBX), plain old telephone service (POTS), or the like. Although the second communication device 114b is described as being a desktop phone in this example, it should be understood that in other aspects the second communication device 114b may be any suitable device that may perform audio and/or video communications such as, but not limited to, mobile phones, VoIP phones, desktop computers, laptop computers, and the like, and may be connected to the network 150 via its communications module or the like. In certain aspects, the communications modules 216, 218, 220, 222 may be, for example, modems, Ethernet cards, and/or other suitable communications hardware/software.

The computing device 110 includes a processor 228, the communications module 216, and a memory 230 that includes the platform 210, notification services 232, and call status data 234. The processor 228 of the computing device 110 is configured to execute instructions, such as instructions physically coded into the processor 228, instructions received from software in the memory 230, instructions delivered from a remote memory, or a combination thereof. In general, the processor 228 of the computing device 110 is configured to receive user input from a user 235 accessing the platform 210 over the network 150 using either the web application 212 in a memory 236 of the first client device 116a or the mobile application 214 in a memory 238 of the second client device 116b. The processor 228 of the computing device 110 is also configured to receive parameters from, and transmit parameters 239 to, the first communication device 114a via the one or more servers 112. The parameters may include data corresponding to usernames, passwords, authentication data, device identification data, communication session data, and device control data. Additionally, the parameters may also include data associated with queues, subscriptions, user maintenance, synchronizing communications or messages, metrics, and device rebooting.

Figure 3:
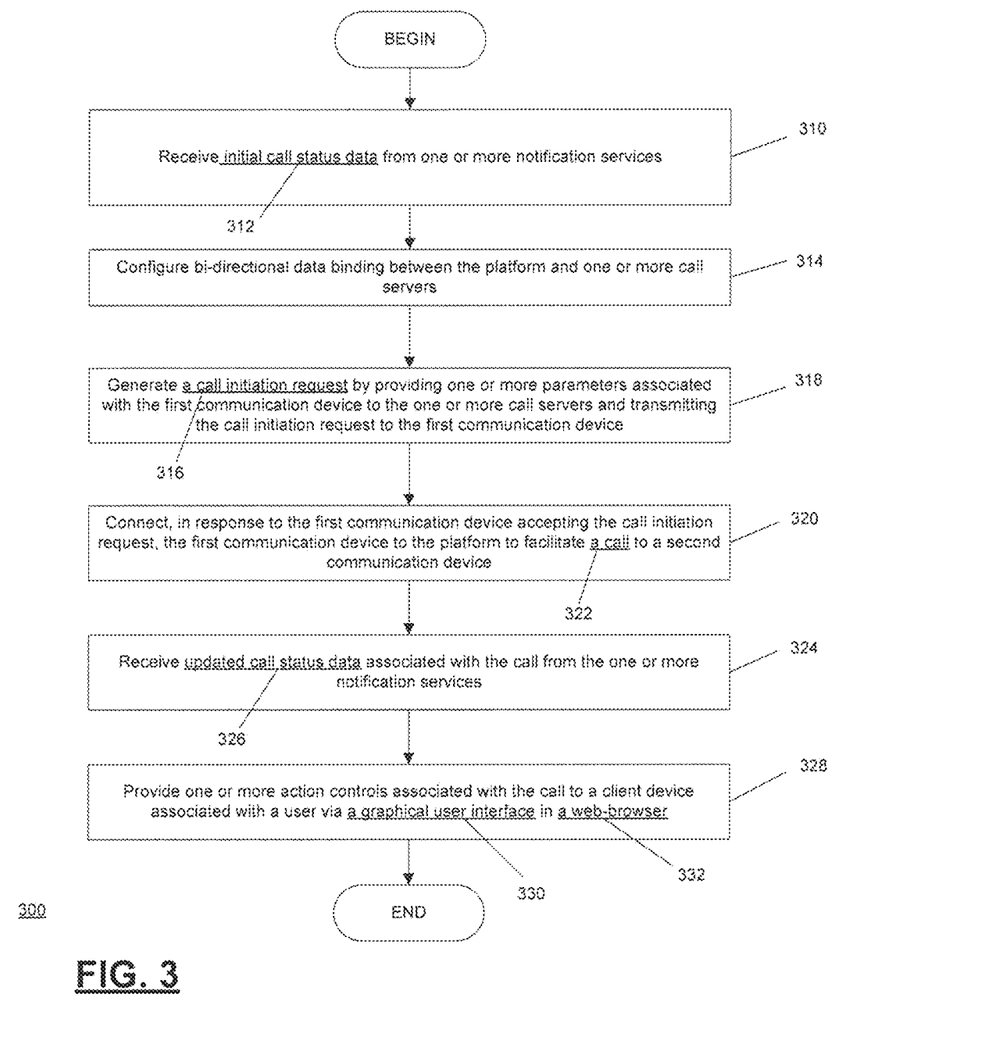
FIG. 3 illustrates an example process for controlling a communication device using a web-based unified communication platform using the example computing device(s) and server(s) of FIG. 2.

For example, with reference to FIG. 3, the processor 228 of the computing device 110 executes instructions to receive initial call status 312 (see FIG. 3) from the one or more notification services 232. The processor 228 also executes instructions to configure bi-directional data binding 244 between the platform 210 and the one or more servers 112. The processor 228 also executes instructions to generate a call initiation request 316 (see FIG. 3) by providing one or more parameters 239 associated with the first communication device 114a to the one or more servers 112 and transmitting the call initiation request 316 (see FIG. 3) to the first communication device 114a. In some implementations, the generation of the call initiation request 316 is performed by providing the one or more parameters 239 associated with the first communication device 114a using a web services application programming interface (API). The processor 228 also executes instructions to connect, in response to the first communication device 114a accepting the call initiation request 316, the first communication device 114a to the platform 210 to facilitate a call 322 (see FIG. 3) to a second communication device, such as the second communication device 114b. The processor 228 also executes instructions to receive updated call status data 326 (see FIG. 3) associated with the call 322 from the one or more notification services 232. The processor 228 also executes instructions to provide one or more action controls, such as communication device controls 246, associated with the call 322 to a client device, such as the first client device 116a, associated with a user, such as the user 235, via a graphical user interface 330 (see FIG. 3) in a web-browser 332 (see FIG. 3). For example, the first client device 116a shares a virtual state 237, as illustrated by a dotted line, with the first communication device 114a. The processor 228 also executes instructions to switch the one or more action controls, such as communication device controls 246, from the first client device 116a to a second client device 116b associated with the user.

The one or more servers 112 include a processor 240, the communications module 218, and a memory 242. The processor 240 of the one or more servers 112 is configured to execute instructions, such as instructions physically coded into the processor 240, instructions received from software in the memory 242, instructions delivered from a remote memory, or a combination thereof. The processor 240 of the one or more servers 112 is configured for bi-directional data binding 244, as illustrated by dashed elliptical, or handshaking with the platform 210 via the processor 228 of the computing device 110.

The first communication device 114a includes the parameters 239 and communication device controls 246. The parameters 239 and the communication device controls 246 can be transmitted to the one or more servers 112 and further to the platform 210 via the bi-direction data binding 244. The first communication device 114a can be, for example, a desktop phone that includes the communication device controls 246 or action controls such as, but not limited to, initiating a call, receiving a call, call forwarding, redialing, call hold, call conferencing, shortcut-key dialing, availability indicators, phone directory menus, voice message recording, recording an active call, blind transfer, sending a call to voicemail, or receiving voicemail data, initiating or receiving a conference call, selecting an alternative communication device that is controllable by the platform 210, and the like. For example, the first communication device 114a can receive a call from the second communication device 114b, which, for example, is also a desktop phone. In certain aspects, the second communication device 114b, however, can be any suitable device that may perform audio and/or video communications such as, but not limited to, mobile phones, VoIP phones, desktop computers, laptop computers, and the like, and may be connected to the network 150 via its communications module or the like. In some implementations, the first communication device 114a is compatible with a key system unit-less system, a key system unit system, a private branch exchange system, and a voice over internet protocol system. In some implementations, the first communication device 114a may be an internet protocol phone, a softphone, a conference phone, or the like.

The first client device 116a includes a processor 248, the communications module 220, and the memory 226 that includes the web application 212 and a call controller 250. The first client device 116a also comprises an input device 252, such as a keyboard, mouse, and/or another suitable input device, and an output device 254, such as a display, port, transducer, and/or another suitable output device. The processor 248 of the first client device 116a is configured to execute instructions, such as instructions physically coded into the processor 248, instructions received from software in the memory 226, instructions delivered from a remote memory, or a combination thereof. In general, the processor 222 of the first client device 116a is configured to transmit information, such as data, requests, responses, and commands input to the input device 252 to the platform 210 on the computing device 110 via the web application 212. Similarly, the processor 248 of the first client device 116a is also configured to receive information from the platform 210 on the computing device 110 via the web application 212.

The second client device 116b includes a processor 256, the communications module 222, and the memory 238 that includes the mobile application 214. The second client device 116b also comprises an input device 258, such as a touch screen, a keyboard, mouse, and/or another suitable input device, and an output device 260, such as a display, port, transducer, and/or another suitable output device. The second client device 116b is configured to execute instructions, such as instructions physically coded into the processor 256, instruction received from software in the memory 238, instructions delivered from a remote memory, or a combination thereof. In general, the processor 256 of the second client device 116b is configured to transmit information, such as data, requests, responses, and commands input to the input device 258 to the platform 210 on the computing device 110 via the mobile application 214. Similarly, the processor 256 of the second client device 116b is also configured to receive information from the platform 210 on the computing device 110 via the mobile application 214.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

FIG. 3 illustrates an example process 300 for controlling a communication device using a web-based unified communication platform using the example computing device 110 of FIG. 2. While FIG. 3 is described with reference to the system 200 of FIG. 2, it should be noted that the process steps of FIG. 3 may be performed by other systems having more or fewer components as compared with the system 200 of FIG. 2.

The process 300 begins by proceeding to step 310 when the platform 210 receives initial call status 312 from the one or more notification services 232. At step 314, the platform 210 instructs the processor 218 of the computing device 110 to configure bi-directional data binding 244 between the platform 210 and the one or more servers 112. The platform 210 instructs the processor 218 of the computing device 110 to generate a call initiation request 316 by providing one or more parameters 239 associated with the first communication device 114a to the one or more servers 112 and transmitting the call initiation request 316 to the first communication device 114a, as illustrated at step 318. At step 320, in response to the first communication device 114a accepting the call initiation request 316, the platform 210 instructs the processor 218 of the computing device 110 to connect the first communication device 114a to the platform 210 to facilitate a call 322 to a second communication device, such as the second communication device 114b. At step 324, the platform 210 receives updated call status data 326 associated with the call 322 from the one or more notification services 232. At step 328, the platform 210 instructs the processor 218 of the computing device 110 to provide one or more action controls, such as communication device controls 246, associated with the call 322 to a client device, such as the first client device 116a, associated with a user, such as the user 235, via a graphical user interface 330 in a web-browser 332.

An example process, such as the process 300 of FIG. 3, will now be described in reference to example screenshots illustrated in FIGS. 4A-4F. For example, as shown in diagram 400A of FIG. 4A, the user 235 may be presented with a first graphical user interface (GUI) 410 when the user 235 first logs into the platform 210 via, for example, the first client device 116a. The first GUI 410 informs the user 235 at display element 412 of their preferred communication device such as, for example, the second client device 116b or the first communication device 114a. The first GUI 410 further provides the user 235 with a first graphical element 414 to change their preferred communication device. For example, if the preferred communication device is the first communication device 114a, then the user 235 could change the preferred communication device from the first communication device 114a to the second client device 116b. After the user 235 has selected the preferred communication device, the user can confirm the selection by selecting a second graphical element 416 to proceed. In some implementations, the user 235 may also navigate away from the first GUI 410 to select a preferred communication device in the exemplary communication platform setting menu 418, as illustrated in diagram 400B in FIG. 4B.

Figure 4A:
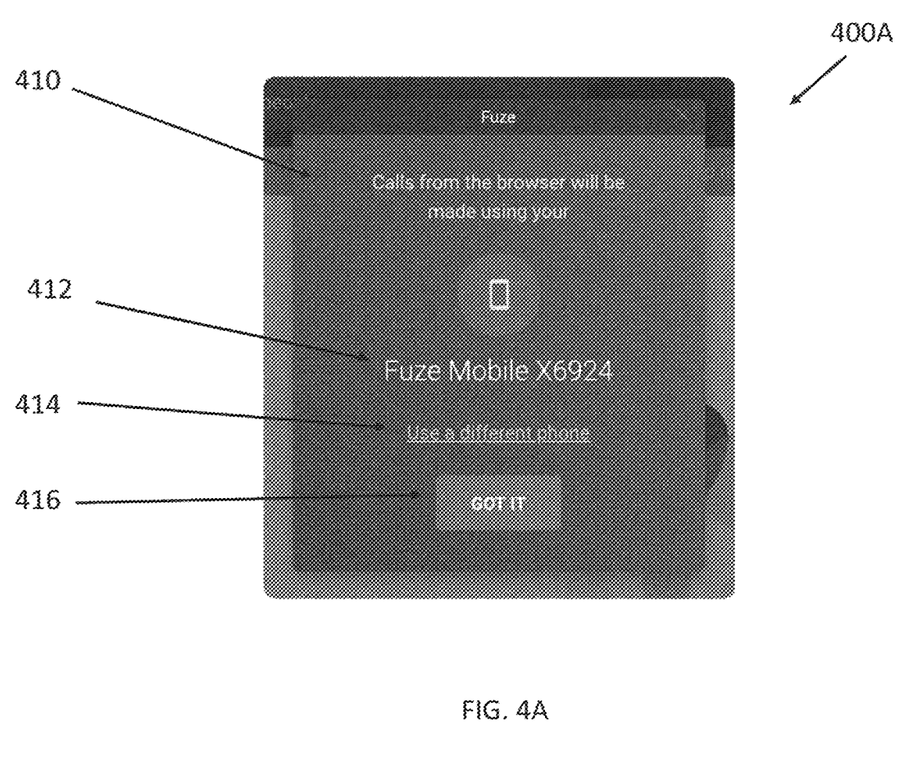
FIGS. 4A-4F are example illustrations associated with the example process of FIG. 3.
Figure 4B:
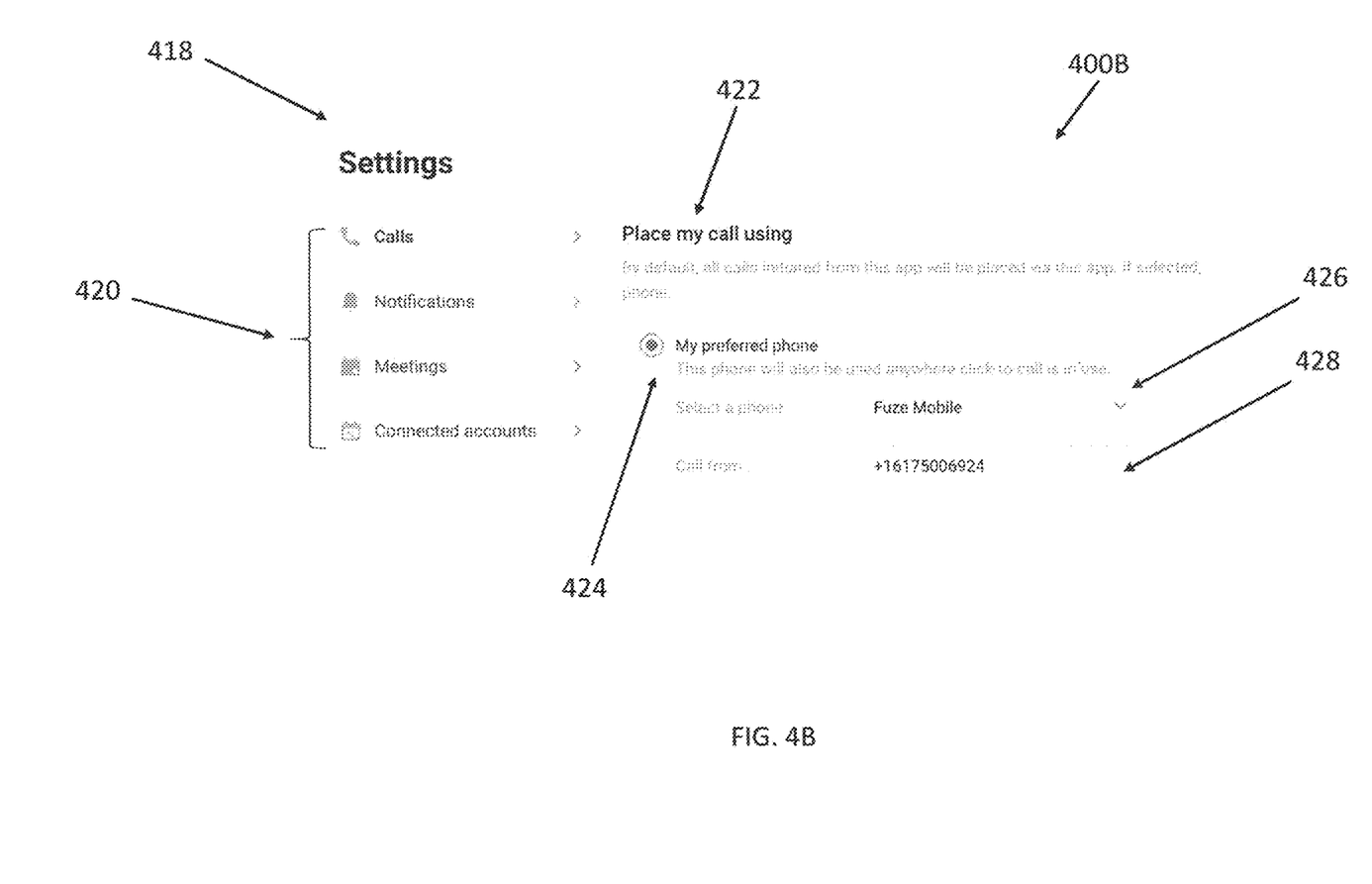

The communication platform setting menu 418 includes a plurality of configurable settings 420, each related to settings associated with different communications or data supported by the communications platform 210. For example, upon selecting the configurable setting 420 for "Calls," the user 235 would be presented with call settings 422 related to the particular communication to be used with the communication platform 210. The user 235 may provide input at a button 424 identifying their preferred communication such as, for example, the second client device 116b or the first communication device 114a by selecting a phone from a drop-down menu 426 and/or by entering into a field 428 a phone number associated with the selected communication device.

Figure 4C:
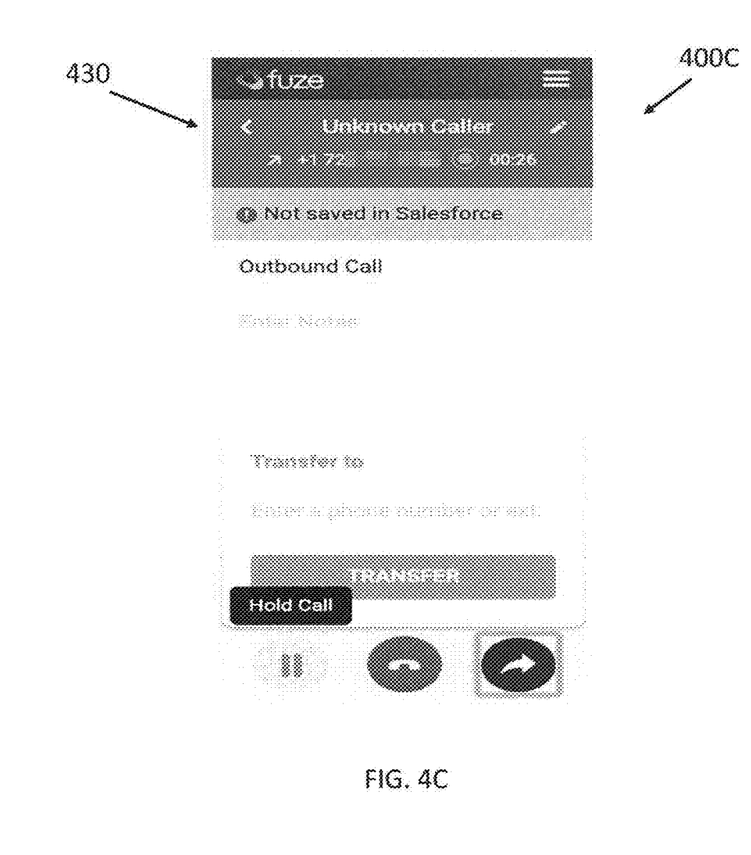

As illustrated in a diagram 400C in FIG. 4C, during the active call 322 or meeting, the user 235 may be presented with a second GUI 430 on, for example, the first client device 116a, which may be a desktop or laptop computer. The second GUI 430 allows the user 235 to control the communication device controls 246 of, for example, the first communication device 114a from the first client device 116a via the web application 212 connected to the platform 210.

Figure 4D:
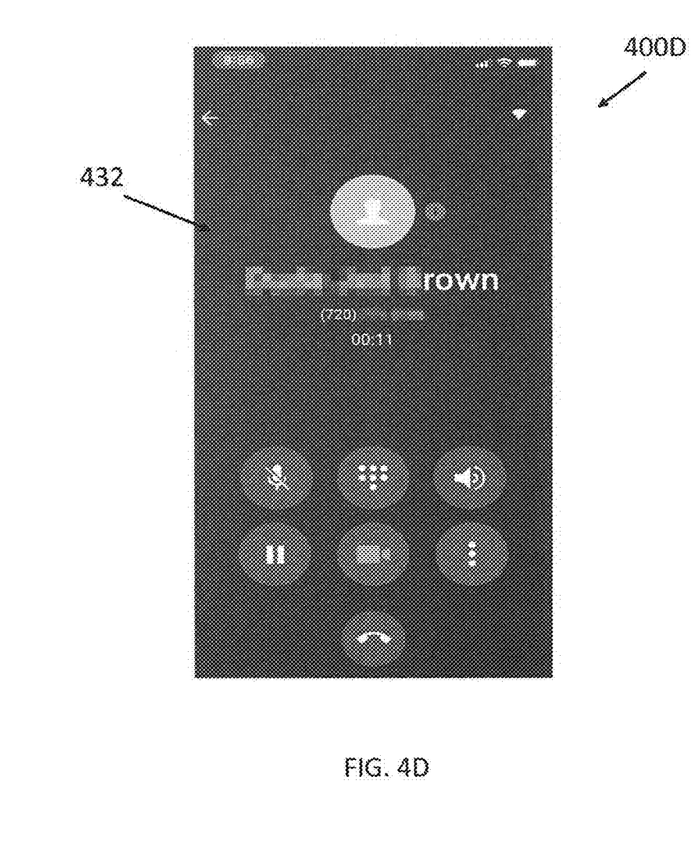

As illustrated in a diagram 400D in FIG. 4D, during the active call 322 or meeting, the user 235 may be presented with a third GUI 432 on, for example, the second client device 116b, which may be a mobile phone. The third GUI 432 allows the user 235 to control the communication device controls 246 of, for example, the first communication device 114a from the second client device 116b via the mobile application 214 connected to the platform 210.

Figure 4E:
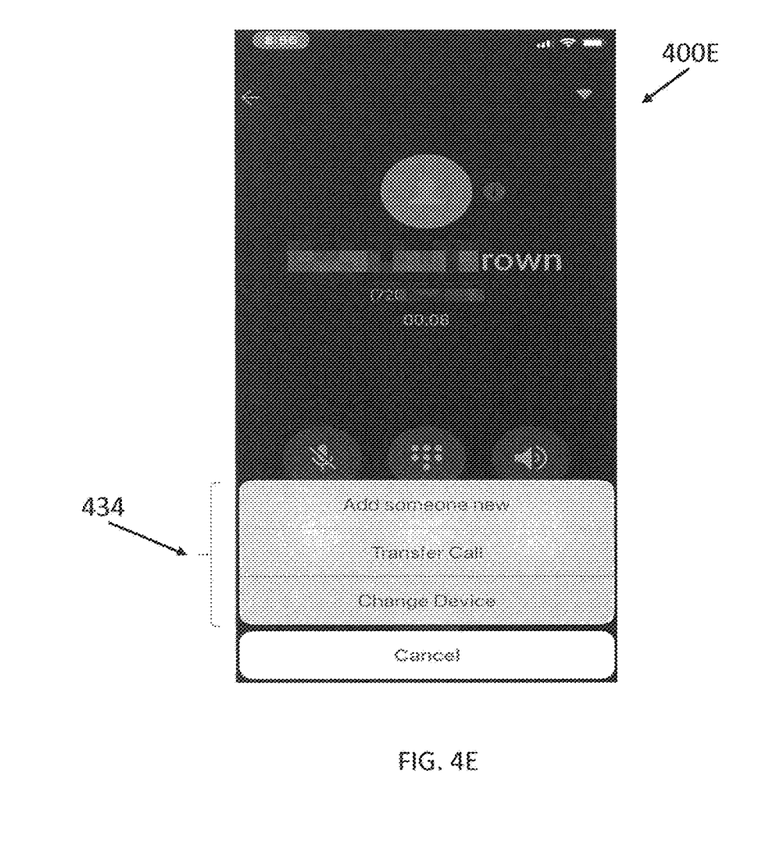
Figure 4F:
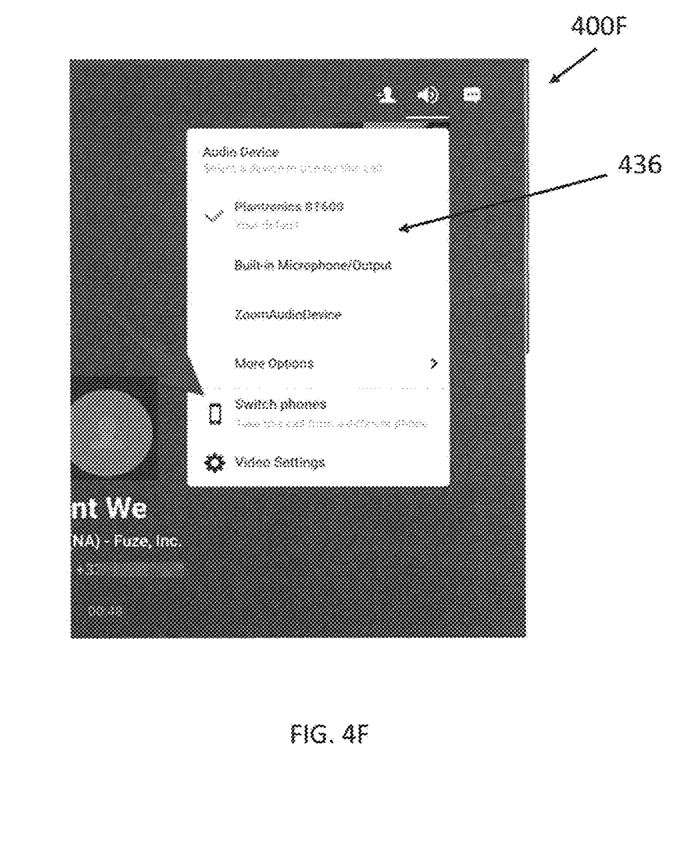

As illustrated in a diagram 400E in FIG. 4E, during the active call 322 or meeting, the user 235 may be selectively presented with a plurality of switching options 434 on, for example, the second client device 116b, which may be a mobile phone. The user 235 may select the "Change Device" option from the plurality of switching options 434, which allows the user 235 on the second client device 116b to switch to another device associated with the user 235 such as, for example, the first client device 116a. Similarly, as illustrated in a diagram 400F in FIG. 4F, during the active call 322 or meeting, the user 235 may be selectively presented with a plurality of web options 436 on, for example, the first client device 116a, which may be a desktop or laptop computer. The user 235 may select the "Switch phones" option from the plurality of web options 436, which allows the user 235 on the first client device 116a to switch to another device associated with the user 235 such as, for example, the second client device 116b. The "Change Device" and "Switch phones" options allows the user 235 to take an ongoing active communication, such as the active call 322 or meeting, and instruct the notification services 232 via either the web application 212 or the mobile application 214 to move the active communication to a new different device. The new device could be a different web application 212 or mobile application 214 on another computer, tablet, Web, or phone associated with the user 235. In some implementations, the user 235 may select to only switch the voice component of the active communication to the new device. For example, the user 235 may be in an office environment using the web application 212 on a desktop computer, but does not have access to the mobile application 214, so the user 235 can switch the voice component of the active communication to a personal phone carrier associated with the user 235 when the user leaves the office environment to a car. As another example, the user 235 may be on a meeting or call using the mobile application 214 on a mobile phone and enters a conference room with partitioned spaces including a desk phone such that the user 235 can selectively switch the voice component of the ongoing meeting or call from the mobile phone to desk phone.

Hardware Overview

Figure 5:
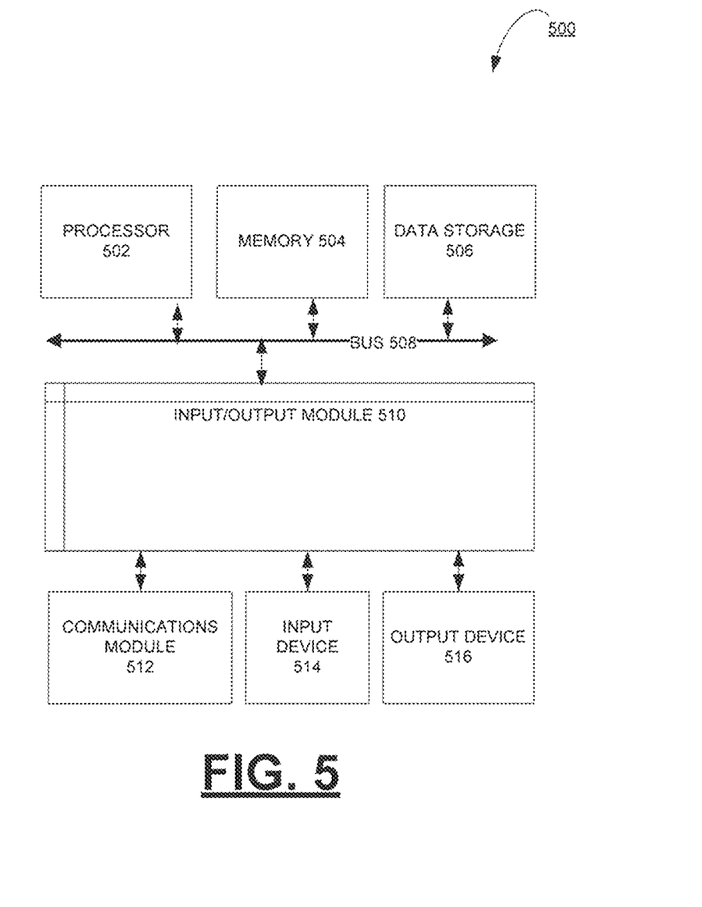
FIG. 5 is a block diagram illustrating an example computer system with which the computing device, the server, and the first and second clients of FIG. 2 can be implemented.

FIG. 5 is a block diagram illustrating an example computer system 500 with which the computing device 110, the one or more servers 112, and the one or more clients 116, such as a first client device 116a and a second client device 116b, of FIG. 2 can be implemented. In certain aspects, the computer system 500 may be implemented using hardware or a combination of software and hardware, either in a dedicated server, integrated into another computing component, or distributed across multiple computing components.

Computer system 500 (e.g., the computing device 110, the one or more servers 112, and the one or more clients 116, such as a first client device 116a and a second client device 116b) may include a bus 508 and/or another suitable communication mechanism for communicating information, and one or more processors 502 (e.g., processor 228, 240, 248, 256) coupled with the bus 508 for processing information. According to one aspect, the computer system 500 can be a cloud computing server of an IaaS that is able to support PaaS and SaaS services. According to an example embodiment, the computer system 500 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 500 may be implemented with the one or more processors 502. The one or more processors 502 may comprise a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

The computer system 500 may include, in addition to hardware, code that creates an execution environment for the computer program in question, e.g., code that constitutes processor firmware, a protocol stack, a database management system, an operating system, or a combination of one or more of them stored in an included memory 504 (e.g., memory 230, 242, 226, 238), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 508 for storing information and instructions to be executed by the one or more processors 502. The processor(s) 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may further include secure information. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 504 may also be used for storing temporary variables or other intermediate information during execution of instructions to be executed by the processor(s) 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 252, 258 and output device 254, 260). The input/output module 510 can be any input/output module. Example input/output modules 510 include data ports such as USB ports. In addition, input/output module 510 may be provided in communication with the processor(s) 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. The communications modules 512 (e.g., communications module 216, 218, 220, 222) may comprise networking interface cards, such as Ethernet cards and/or modems.

The components of the system can be interconnected by any form or medium of digital data communication, e.g., a communication network. The communication network (e.g., the network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link and communications module 512. In the Internet example, a server might transmit a requested code for an application program through the Internet, the ISP, the local network, and the communications module 512. The received code may be executed by the processor(s) 502 as it is received, and/or stored in the data storage device 506 for later execution.

In certain aspects, the input/output module 510 is configured to connect to a plurality of devices, such as an input device 514 (e.g., the input device 252, 258) and/or an output device 516 (e.g., the output device 254, 260). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the computing device 110, the one or more servers 112, and the one or more clients 116, such as a first client device 116a and a second client device 116b can be implemented using the computer system 500 in response to the processor(s) 502 executing one or more sequences of one or more instructions contained in the memory 504. Such instructions may be read into the memory 504 from another machine-readable medium, such as the data storage device 506. Execution of the sequences of instructions contained in the memory 504 causes the processor(s) 502 to perform the process steps described herein. One or more processors in a multi-processing arrangement may also be employed to execute the sequences of instructions contained in the memory 504. The processor(s) 502 may process the executable instructions and/or data structures by remotely accessing the computer program product, for example by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

As mentioned hereinabove, the computing system 500 may include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 506. Volatile media include dynamic memory, such as the memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his)

include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method controlling a communication device using a communication platform, the method comprising:
    receiving initial call status data from one or more notification services;
    configuring bi-directional data binding between the communication platform and one or more call servers, wherein the bi-directional data binding includes communication device controls associated with a first communication device;
    generating a call initiation request by providing one or more parameters associated with the first communication device to the one or more call servers and transmitting the call initiation request to the first communication device;
    connecting, in response to the first communication device accepting the call initiation request, the first communication device to the communication platform to facilitate a call to a second communication device;
    receiving updated call status data associated with the call from the one or more notification services;
    providing one or more action controls associated with the call to a first client device associated with a user via a graphical user interface in a web-browser, wherein the one or more action controls comprise the communication device controls associated with the first communication device and cause the first communication device to perform a selected action from the action controls; and
    switching the one or more action controls from the first client device to a second client device associated with the user to move an active communication to the second client device.

2. The computer-implemented method of claim 1, wherein upon connecting the first communication device to the communication platform, the method further comprises:
    receiving a second call from the second communication device;
    monitoring a call status, the call status being associated with the second call between the first and the second communication devices, and the call status being received from the one or more notification services; and
    providing one or more action controls associated with the second call to the user via the graphical user interface in the web-browser.

3. The computer-implemented method of claim 1, wherein generating the call initiation request is performed by providing the one or more parameters associated with the first communication device using a web services application programming interface (API).

4. The computer-implemented method of claim 3, wherein the first communication device includes one or more communication devices that are compatible with a key system unit-less system, a key system unit system, a private branch exchange system, and a voice over internet protocol system.

5. The computer-implemented method of claim 1, wherein the first communication device includes one or more communication devices that are compatible with a key system unit-less system, a key system unit system, a private branch exchange system, and a voice over internet protocol system.

6. The computer-implemented method of claim 1, wherein the first communication device includes a desktop phone, a mobile phone, a smartphone, an internet protocol phone, a softphone, and a conference phone.

7. The computer-implemented method of claim 1, wherein configuring bi-directional data binding between the communication platform and one or more call servers includes configuring session initiation protocol data.

8. The computer-implemented method of claim 7, wherein the session initiation protocol data includes permission-based authentication data associated with the first communication device.

9. The computer-implemented method of claim 1, wherein the one or more action controls provided to the user via the graphical user interface further comprise action controls to perform receiving a call, recording an active call, pause active call recording, muting or unmuting a call, placing a call on hold, receiving a call from hold, blind transfer of a call, attended transfer of a call, sending a call to voicemail or receiving voicemail data, initiating or receiving a conference call, and selecting an alternate communication device that is controllable by the communication platform.

10. The computer-implemented method of claim 1, wherein the one or more action controls provided to the user via the graphical user interface further comprise action controls associated with a user's availability status and/or notification preferences corresponding to one or more collaboration circles for which the user is a member.

11. A system for controlling a communication device using a communication platform, the system comprising:
a memory comprising instructions; and
one or more processors configured to execute the instructions to:
receive initial call status data from one or more notification services;
configure a bi-directional data binding between the communication platform and one or more call servers, wherein the bi-directional data binding includes communication device controls associated with a desktop phone;
generate a call initiation request by providing one or more parameters associated with the desktop phone to the one or more call servers and transmitting the call initiation request to the desktop phone;
connect, in response to the desktop phone accepting the call initiation request, the desktop phone to the communication platform to facilitate a call to a first communication device;
receive updated call status data associated with the call from the one or more notification services;
provide one or more action controls associated with the call to a first client device associated with a user via a graphical user interface in a web-browser, wherein the one or more action controls comprise the communication device controls associated with the first communication device and cause the first communication device to perform a selected action from the action controls; and
switch the one or more action controls from the first client device to a second client device to move an active communication to the second client device.

12. The system of claim 11, wherein the one or more processors is further configured to execute the instructions to:
receive a second call from a second communication device;
monitor a call status, the call status being associated with the second call between the desktop phone and the second communication device, the call status being received from the one or more notification services; and
provide one or more action controls associated with the second call to the user via the graphical user interface in the web-browser.

13. The system of claim 11, wherein the instruction to generate the call initiation request is performed by providing the one or more parameters associated with the desktop phone using a web services application programming interface (API).

14. The system of claim 13, wherein the desktop phone includes one or more communication devices that are compatible with a key system unit-less system, a key system unit system, a private branch exchange system, and a voice over internet protocol system.

15. The system of claim 11, wherein the desktop phone includes one or more communication devices that are compatible with a key system unit-less system, a key system unit system, a private branch exchange system, and a voice over internet protocol system.

16. The system of claim 11, wherein the communication device includes a desktop phone, a mobile phone, a smartphone, an internet protocol phone, a softphone, and a conference phone.

17. The system of claim 11, wherein the one or more action controls provided to the user via the graphical user interface further comprise action controls to perform receiving a call, recording an active call, pause active call recording, muting or unmuting a call, placing a call on hold, receiving a call from hold, blind transfer of a call, attended transfer of a call, sending a call to voicemail or receiving voicemail data, initiating or receiving a conference call, and selecting an alternate communication device that is controllable by the communication platform.

18. A non-transitory machine-readable storage medium, comprising machine-readable instructions for causing a processor to execute a method, the method comprising:
receiving initial call status data from one or more notification services;
configuring bi-directional data binding between a platform and one or more call servers, wherein the bi-directional data binding includes communication device controls associated with a desktop phone;
generating a call initiation request by providing one or more parameters associated with the desktop phone to the one or more call servers and transmitting the call initiation request to the desktop phone;
connecting, in response to the desktop phone accepting the call initiation request, the desktop phone to the platform to facilitate a call to a communication device;
receiving updated call status data associated with the call from the one or more notification services;

providing one or more action controls associated with the call to a first client device associated with a user via a graphical user interface in a web-browser, wherein the one or more action controls comprise the communication device controls associated with the communication device and cause the communication device to perform a selected action from the action controls; and switching the one or more action controls from the first client device to a second client device to move an active communication to the second client device.

19. The non-transitory machine-readable storage medium of claim 18, wherein the desktop phone includes one or more communication devices that are compatible with a key system unit-less system, a key system unit system, a private branch exchange system, and a voice over internet protocol system.

* * * * *